United States Patent
Fanti et al.

(10) Patent No.: US 8,984,929 B2
(45) Date of Patent: Mar. 24, 2015

(54) PRESSURE INDICATING DEVICE

(71) Applicants: Lisa A. Fanti, Hopewell Junction, NY (US); Lloyd A. Brown, East Amherst, NY (US); Serge M. Campeau, Lancaster, NY (US); Ronald F. Spohn, Getzville, NY (US); Murat Gunay, Niagara Falls (CA)

(72) Inventors: Lisa A. Fanti, Hopewell Junction, NY (US); Lloyd A. Brown, East Amherst, NY (US); Serge M. Campeau, Lancaster, NY (US); Ronald F. Spohn, Getzville, NY (US); Murat Gunay, Niagara Falls (CA)

(73) Assignee: Praxair Technology, Inc., Danbury, CT (US)

( * ) Notice: Subject to any disclaimer, the term of this patent is extended or adjusted under 35 U.S.C. 154(b) by 358 days.

(21) Appl. No.: 13/720,065

(22) Filed: Dec. 19, 2012

(65) Prior Publication Data

US 2014/0165706 A1 Jun. 19, 2014

(51) Int. Cl.
*G01M 3/08* (2006.01)
*G01M 3/28* (2006.01)
*G01M 3/26* (2006.01)

(52) U.S. Cl.
CPC .............. *G01M 3/2876* (2013.01); *G01M 3/26* (2013.01)
USPC .......................................................... 73/46

(58) Field of Classification Search
CPC ............................... G01M 3/26; G01M 3/2876
USPC ............................................................ 73/40, 46
See application file for complete search history.

(56) References Cited

U.S. PATENT DOCUMENTS

| 4,246,864 | A | * | 1/1981 | Pasternack ........................ 116/4 |
| 4,948,931 | A | * | 8/1990 | Nixon et al. ................ 200/83 P |
| 4,951,697 | A | * | 8/1990 | Fritts .......................... 137/68.18 |
| 5,495,748 | A | * | 3/1996 | Brede et al. ....................... 73/40 |
| 7,632,342 | B2 | | 12/2009 | Nakanoya et al. |

FOREIGN PATENT DOCUMENTS

GB 2 077 395 A 12/1981

OTHER PUBLICATIONS

M. T. Donovan et al. "Experimental Investigation of Silane Combustion and Particle Nucleation Using a Rapid-Compression Facility". Elsevier, Combustion and Flame 141 (2005) pp. 360-370.

* cited by examiner

*Primary Examiner* — Hezron E Williams
*Assistant Examiner* — David Z Huang
(74) *Attorney, Agent, or Firm* — Nilay S. Dalal

(57) ABSTRACT

A pressure indicating device for detecting and isolating leakage of toxic and/or pyrophoric gasses from within various packages is disclosed. The device can affix to a user port of a cylinder package. The device has a flexible disc-like structure which is fine tuned to outwardly flex in response to a build-up of pressure of the gas exerted against the disc-like structure. The flexed disc contacts a movable pin and pushes the push outwards from within the device. The outward movement of the pin pierces a paper seal extending over the device, thereby indicating a leak from within the valving of the package. The device withstands the pressure exerted against it, thereby also isolating the leak of the pressurized gas.

19 Claims, 6 Drawing Sheets

PRESSURE INDICATING DEVICE

FIELD OF THE INVENTION

The present invention relates to a pressure indicating device to be attached to a user port of various gas packages. The device is capable of visually indicating a valve leak and isolating the leak to prevent any material inside the cylinder from escaping.

BACKGROUND OF THE INVENTION

Industrial processing and manufacturing applications, such as semiconductor manufacturing, typically require the safe handling of toxic, corrosive and/or flammable hydridic and halidic gases and mixtures thereof. By way of example, the semiconductor industry often relies on the gaseous hydrides of silane ($SiH_4$), and liquefied compressed gases such as arsine ($AsH_3$) and phosphine ($PH_3$) for wafer processing. Various semiconductor processes utilize $SiH_4$, $AsH_3$ or $PH_3$ from vessels that have storage pressures as high as 1500 psig. As a result of their extreme toxicity and/or pyrophoricity and high vapor pressure, uncontrolled release of these gases, which can occur due to delivery system component failure, or human error during cylinder change-out procedures, may lead to catastrophic results. For example, the release of a flammable gas such as silane may result in a fire, system damage and/or potential for personal injury. Leaks of a highly toxic gas, such as arsine, could result in personal injury or even death.

A pyrophoric gas such as silane after filling into a package, is attached with an outlet cap. However, internal leakage of silane across the valve seat can accumulate within a dead space volume behind the outlet cap. When the cap is removed, the leaked silane can emerge from the user port and come into contact with air, resulting in a "popping" sound. The popping sound can be accompanied by a flame in the user port. Relatively smaller silane leaks may give no visual indication of a leak, but yet can result in a popping sound when the silane comes into contact with air. The popping can also be accompanied by a flame in the user port.

The internal leakage of silane across the valve seat can occur during the transport of silane cylinders, during which sufficient momentum can be imparted to the valve seat causing it to momentarily open and then reseat. This momentary opening of the valve seat is known as "burping" in the industry, and can put sufficient pressure under the outlet cap, such that popping can occur when the cap is removed. Burping can be a particular problem with spring-loaded pneumatic valves.

Additionally, silane can oxidize to form silicon dioxide white particulates, which can then deposit on the valve seat. By virtue of the deposited particles, the valve can no longer make a leak-tight seal when the valve is closed, thereby resulting in leakage across the port (known as cross porting in the gas industry).

There is an unmet need to improve the safety of silane packages. Other aspects of the present invention will become apparent to one of ordinary skill in the art upon review of the specification, drawings, and claims appended hereto.

SUMMARY OF THE INVENTION

The present invention is directed to a pressure indicating device affixed to a user port of a pressurized cylinder. The device has a flexible disc-like structure which can be fine tuned to outwardly flex in response to a build-up of pressure of the gas exerted against the disc-like structure. The flexed disc contacts a movable pin and pushes the pin outwards from within the device. The outward movement of the pin pierces a seal extending over the device, thereby visually indicating an internal leak across a valve seat from within the valve of the cylinder. The device is designed to provide such an indicator only when dangerous levels of gas have internally leaked within the cylinder. In this manner, the visual indicator notifies an operator to not remove the device from the user port, and to not use the cylinder for delivery of gas contained within the cylinder. The device withstands the pressure exerted against it, thereby also isolating the leak of the pressurized gas.

The invention may include any of the following aspects in various combinations and may also include any other aspect described below in the written description or in the attached drawings.

In a first aspect of the invention, a pressure indicating device for recording and isolating a leak of pressurized gas from a closed valve of a gas cylinder is provided. The pressure indicating device comprises a housing defined, in part, by an upper housing portion and a lower housing portion, the upper housing portion characterized by an inner channel extending therethrough, and the lower housing portion characterized by a gas flow channel extending therethrough. The lower housing portion is disposed within a user port of the cylinder valve. A movable pin is disposed within the interior channel of the upper housing portion. A solid diaphragm in a neutral state is disposed between the upper and the lower housing portions. The diaphragm has a bottom surface and a top surface. The top surface of the solid diaphragm is oriented towards the pin, and the bottom surface of the solid diaphragm is oriented towards the lower housing portion, wherein the bottom surface is in fluid communication with the gas flow channel. The diaphragm is sealed in place along an edge thereof. A seal is provided that extends along an outer surface of the upper housing through which the pin is configured to extend when said pin is in the activated state. The solid diaphragm is configured to flex from a neutral state to an activated state towards the pin in response to a predetermined activating pressure exerted against at least a portion of the bottom surface of the diaphragm. The diaphragm in the activated state flexes a sufficient amount against the pin so that a portion of the top surface of the diaphragm urges the pin from within the inner channel a sufficient axial distance through the upper housing so as to move the pin externally of the housing, thereby allowing the pin to pierce the material and visually indicate the leak of the pressurized gas from within the interior volume of the cylinder.

In a second aspect of the invention, a safety system for isolating and indicating a leak of pressurized gas is provided. The system comprises a cylinder for holding a pressurized gas; a user pathway defined in part by a valve body affixed to an upper part of the cylinder; a pressure indicating cap having an upper housing and a lower housing mated thereto, the lower housing threadably engaged within the user pathway of the cylinder, the lower housing having a gas flow channel configured to receive a flow of the pressurized gas; the cap further comprising a disc disposed between the upper housing and the lower housing, the disc having a periphery fixably attached to corresponding edge portions of the upper and the lower housing; —a movable pin situated within the upper housing, the pin spaced apart a predetermined distance from the top surface of the disc; wherein the top surface of the disc is configured to flex from a neutral state towards the pin in response to a predetermined accumulation of pressure within the gas flow channel that is exerted against the bottom surface of the disc, the top surface of the disc flexed a sufficient amount to exert a force that pushes the pin outwardly from the upper housing in an axial direction so as to record a pressure leak.

BRIEF DESCRIPTION OF THE DRAWINGS

The objects and advantages of the invention will be better understood from the following detailed description of the preferred embodiments thereof in connection with the accompanying figures wherein like numbers denote same features throughout and wherein.

DETAILED DESCRIPTION OF THE INVENTION

The present disclosure relates to a pressure indicating device. The disclosure is set out herein in various embodiments and with reference to various aspects and features of the invention.

The relationship and functioning of the various elements of this invention are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

Figure 1A:
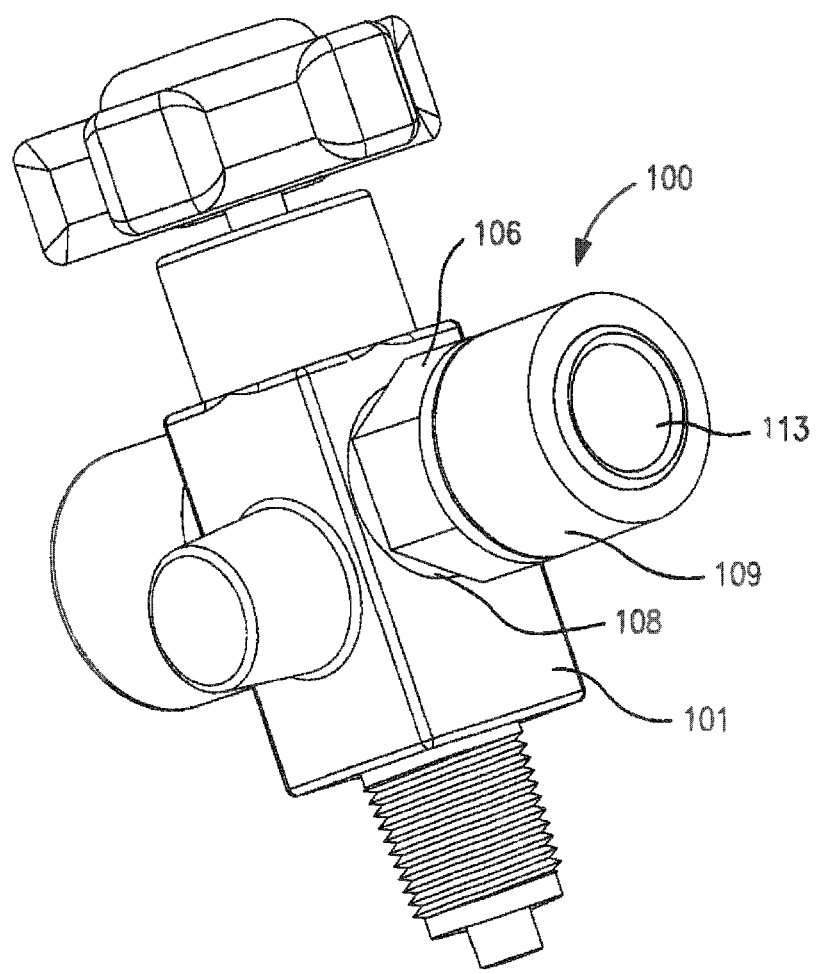
FIG. 1a shows a pressure indicating device incorporating the principles of the invention whereby the device is attached to a lateral port of a valve body.
Figure 1B:
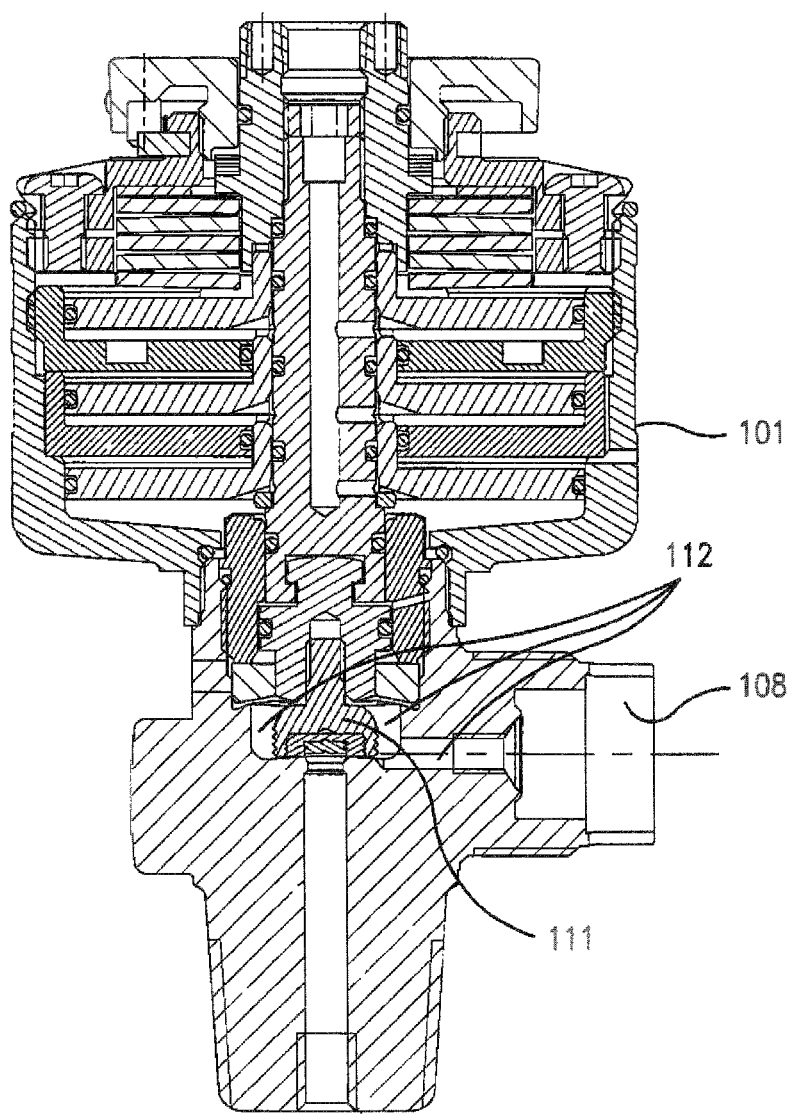
FIG. 1b shows a cross-sectional view of a valve having a lateral user port into which the pressure indicating device of the present invention can engage therewithin.

FIG. 1a shows one embodiment of a pressure indicating device 100 in accordance with principles of the present invention. The device 100 is shown attached into lateral user port 108 of a manual valve body 101. The device having a top housing 109 and material 113 disposed over the top housing 109. A cross-sectional view of a pneumatic valve body 101 into which the device 100 can be inserted is shown in FIG. 1b. Threads located along the bottom housing 106 (FIG. 1a) of device 100 can threadably engage and mate with threads along the user port 108. The threaded portion (FIG. 1a) of valve body 101 can affix to the top of a cylinder body.

In the event that pressurized gas stored within the cylinder leaks across a valve seat 111 (FIG. 1b) of the valve body 101, gas can accumulate within a dead space volume 112 (FIG. 1b) adjacent to the device 100, thereby causing the pressure to a rise up to the fill pressure of the cylinder.

Figure 2A:
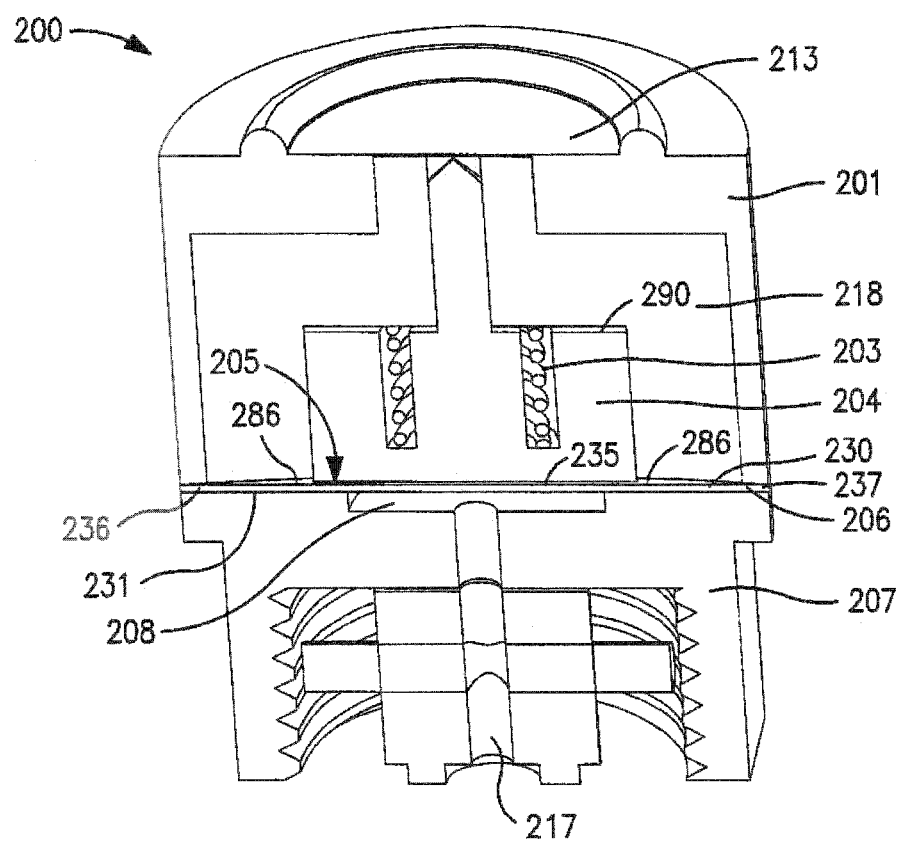
FIG. 2a shows a cross-sectional view of the device of FIG. 1a, whereby the device is in a neutral state.
Figure 2B:
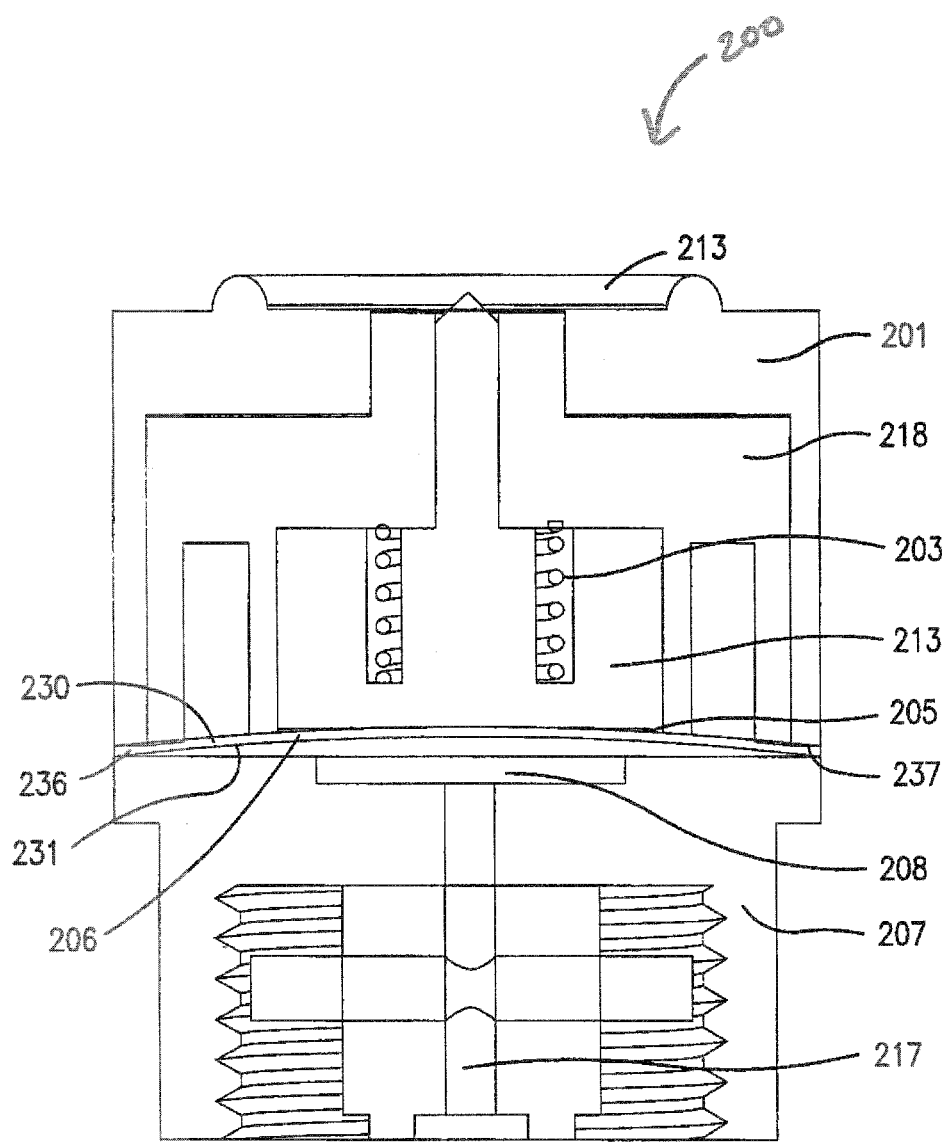
FIG. 2b shows a cross-sectional view of the device of FIG. 1a, whereby the device is in an activated state.

FIGS. 2a and 2b show the pressure indicating device 100 of FIGS. 1a and 1b in cross-sectional view, whereby the device 200 is shown in a neutral state and an activate state, respectively. It should be appreciated by one skilled in the art that that all of the elements of the device 100 of FIGS. 1a and 1b are incorporated into FIGS. 2a and b. As a result, the elements and features of the device 200 shown in FIGS. 2a and 2b should be understood in relation to the elements and features shown in FIGS. 1a and 1b.

With reference to FIGS. 2a and 2b, the rise in pressure is exerted against a flexible diaphragm 206 of the device 200. Generally speaking, and as will be explained in greater detail, the device 200 includes a movable pin 204 that is designed to be urged outwards by a flexible diaphragm 206 in response to the pressure. As the pin 204 axially extends outwards, it pierces material 213 disposed over the top housing 201, as shown in FIG. 2b. The pin 204 remains extended in a so-called "activated state" as the device 200 isolates and contains the pressure, thereby preventing the pressurized gas from leaking beyond device 200. The extended pin 204 and pierced material 213 serve as a visual indicator of the existence of elevated levels of gas leakage across the valve seat 111 and into the user port 108. In this manner, an operator can see that the cylinder has an unacceptable gas leak that is not suitable for use. The ability of the device 200 to isolate a leak of pressurized gas as well as record such a leak prior to cylinder use provides an enhanced level of safety.

FIGS. 2a and 2b show device 200, which represents the device 100 of FIG. 1 in cross-sectional view. It should be appreciated by one skilled in the art that the elements of FIG. 1 are incorporated into FIGS. 2a and 2b. As a result, the elements and features of the device 200 shown in FIG. 2 should be understood in relation to the elements and features shown in FIG. 1.

FIG. 2a shows a cross-sectional view of the device 200 in the relaxed state. The relaxed state as used herein and throughout the specification is defined by the absence of gas leakage or, in the alternative, the absence of gas leakage in an amount sufficient to create a pressure against the flexible diaphragm 206 of the device 200 that urges the movable pin 204 outwards from within the top housing 21. The terms "relaxed" and "neutral" will be used interchangeably throughout the specification and are intended to have the same meaning of a cylinder in a safe state.

FIG. 2a shows the movable pin 204 configured in a relaxed state. The pin 204 is entirely disposed within the top housing 201. The tip of the pin 204 is shown below the material 213 and entirely within the top housing 201. Preferably, the tip is not in contact with the material 213 when the pin 204 is in the relaxed state to avoid inadvertent perforation of the material 213. The pin 204 is shown with no threads to enable it to controllably slide within the top housing 201. A spring 203 is shown coiled around the base of the pin 204. The coiled spring 203 exerts a slight downward force against the pin 204 to prevent inadvertent extension of the pin 204 when in the relaxed state. In one example, the spring 203 may be set between 1-10 psi to prevent the pin 204 from moving in the relaxed state.

The diaphragm 206 resembles a disc-like structure which can be formed from any suitable material, including spring steel or other metal alloys. The diaphragm 206 is configured to flex and urge the pin 204 outwards from the top housing 201 when sufficient leakage of gas across the valve seat 111 and into the user port 108 (FIG. 1b) occurs. The leaked gas thereafter flows through gas channel 217 of device 200 and terminates into the reservoir 208, where pressure can rise to a predetermined activating pressure sufficient to flex the diaphragm 206 upwards into a dome-like structure, as shown in FIG. 2b, so that the device 100 acquires a flexed or activated state. The terms "flexed" and "activated" as used herein are intended to have the same meaning and will be used interchangeably throughout the specification.

FIGS. 2a and 2b show that the diaphragm 206 is disposed between the upper and the lower housing portions 201 and 207, respectively. The diaphragm 206 has a bottom surface 231 and a top surface 230. The top surface 230 is configured so as to face towards the pin 204. FIG. 2a shows a predefined gap 235 exists between the top surface 230 and the bottom of the pin 204 to enable the diaphragm 206 to flex upwards towards the pin 204. The bottom surface 231 of the diaphragm 206 faces in a direction towards the lower housing portion 207. The bottom surface 231 is preferably substantially abutted against the lower housing 207 in the relaxed state (FIG. 2a). The edges 236 and 237 of the diaphragm 206 are sealed in place between the top housing 201 and the lower housing 207. In one embodiment, the edges 236 and 237 are sealed by welding a bead around the entire perimeter of the device 100. Welding can be performed using an orbital welder as known in the art. The thickness of the bead is preferably equal to or greater than the wall thickness of the top housing 201. The edges 236 and 237 are therefore sealed and remain stationary at all times (i.e., during the relaxed state of FIG. 2a and the activated state of FIG. 2b) to prevent gas from flowing outwardly beyond the reservoir 208 and potentially leaking beyond the edges 236 and 237 and out from the device 200. The portions of the diaphragm 206 inward of the edges 236 and 237 are not attached or affixed to any surfaces of the top housing 201 or bottom housing 207, thereby allowing the diaphragm 206 to flex. The bottom surface 231 is in fluid communication with reservoir 208 and gas flow channel 217.

In the event of a leak across valve seat 111 (FIG. 1b) and into the user port 108 (FIG. 1b), gas stored within the interior of a cylinder may flow into gas channel 217 and accumulate within reservoir 208. The reservoir 208 may have any cross-sectional shape. In the embodiment of FIG. 2a and FIG. 2b, the reservoir 208 is rectangular-shaped. The reservoir 208 is designed to have a predetermined volume that is preferably larger in cross-section than the cross-section of gas channel 217 to allow a sufficient build up of pressure to an activating pressure therewithin that adequately flexes the diaphragm 206 to urge the pin 204 axially upwards beyond the top housing 201.

FIG. 2b shows that as gas continues to accumulate within reservoir 208, the pressure rises to a predetermined threshold or activating pressure which causes the diaphragm 206 to flex upwards into the predefined gap 235. The diaphragm 206 undergoes a change in configuration and transitions from the relaxed state of FIG. 2a to the flexed state of FIG. 2b. The top surface 230 of the flexed diaphragm 206 pushes against the pin 204. The diaphragm 206 urges the pin 204 from within the top housing causing the pin 204 to protrude through the top housing 201 and pierce material 213. The pierced material 213 and axially extended pin 204 visually indicate a leakage of gas across the valve seat 111. In a preferred embodiment, when the gas stored is silane, the leakage has occurred at dangerous levels which may result in silane popping if the device 200 is removed from the valve body 101. Accordingly, the pressure indicating device 200 of the present invention can significantly reduce the risk of silane popping by notifying an operator not to remove the device 200 from the user port 108 of the cylinder.

Surrounding or stabilizing material 218 is sufficiently rigid to stabilize, support and maintain the diaphragm 206 in the final flexed configuration shown in FIG. 2b. Material 218 is sufficiently rigid to remain stationary when diaphragm 206 transitions from the relaxed state to the activated state. The specific type of material 218 is selected to prevent the diaphragm 206 from continuing to have a tendency to excessively flex, thereby preventing diaphragm 206 from potentially rupturing. In this manner, the material 218 provides structural support to the flexed diaphragm 206 and maintains diaphragm 206 in the flexed position. The material 218 allows diaphragm 206 to isolate the pressurized gas within the reservoir 208. Should the pressure exerted against the bottom surface 231 of diaphragm 206 increase, the surrounding material 218 will possess sufficient rigidity to counteract such pressure increase, thereby preventing the flexed diaphragm 206 from further having a tendency to flex and/or axially move upwards. The combination of diaphragm 206, surrounding material 218 and other components of device 200 are designed and constructed to preferably hold a maximum pressure equal to about 5/3 of the cylinder rating pressure.

Additionally, the specific type of surrounding material 218 selected is preferably rigid enough to limit the maximum axial distance of the diaphragm 206. Commercially available Delrin® resins and other suitable commercially available plastics known in the art may be utilized in the present invention to impart the necessary rigidity.

FIG. 2a shows that in addition to the predefined gap 235 between the bottom of the pin 204 and the diaphragm 206, a predefined gap 286 is present between the bottom of the surrounding material 218 and the diaphragm 206 in the relaxed state. The predefined gap 286 is created by virtue of the bottom of the surrounding material 218 tapering inward from edges 236 and 237 to each of the sides of the pin 204, as shown in FIG. 2a. The predefined gap 286 permits the diaphragm 206 to axially move as it flexes and can represent the maximum axial distance the diaphragm 206 flexes. The diaphragm 206 to flex and axially move the necessary distance to urge pin 204 outwards through material 213, in response to the activating pressure (i.e., the pressure at which device 200 visually indicates unacceptable leakage levels of gas across the valve seat 111 by pin 204 piercing material 213). The diaphragm 206 can continue to flex upwards until it contacts the surrounding material 218. When the diaphragm 206 flexes upwards and abuts against the surrounding material 218, the gas pressure against the bottom surface 231 of the diaphragm 206 is counteracted by the downward pressure exerted against the top surface 230 of the diaphragm 206 by surrounding materials 218. The diaphragm 206 acquires a final flexed position in which the diaphragm 206 substantially remains until the activating pressure against the bottom surface 231 is removed. The predefined gap 235 between the diaphragm 206 and pin 204 and the predefined gap 286 between the diaphragm 206 and surrounding material 218 have both reduced to substantially zero. Such a reduction in each of gaps 235 and 286 is associated with a corresponding increase in the volume of reservoir 208, as shown in FIG. 2b.

Still referring to FIG. 2a, the pin 204 in the relaxed state may be spaced apart a predetermined gap 290 from surrounding material 218. When pin 204 is urged by diaphragm 206 in response to an activating pressure, the pin 204 can axially move upwards a distance equal to the gap 290. The distance of gap 290 is designed to ensure the tip of pin 204 can extend beyond the top housing portion 201 and pierce material 213 when the diaphragm 206 flexes.

Figure 3:
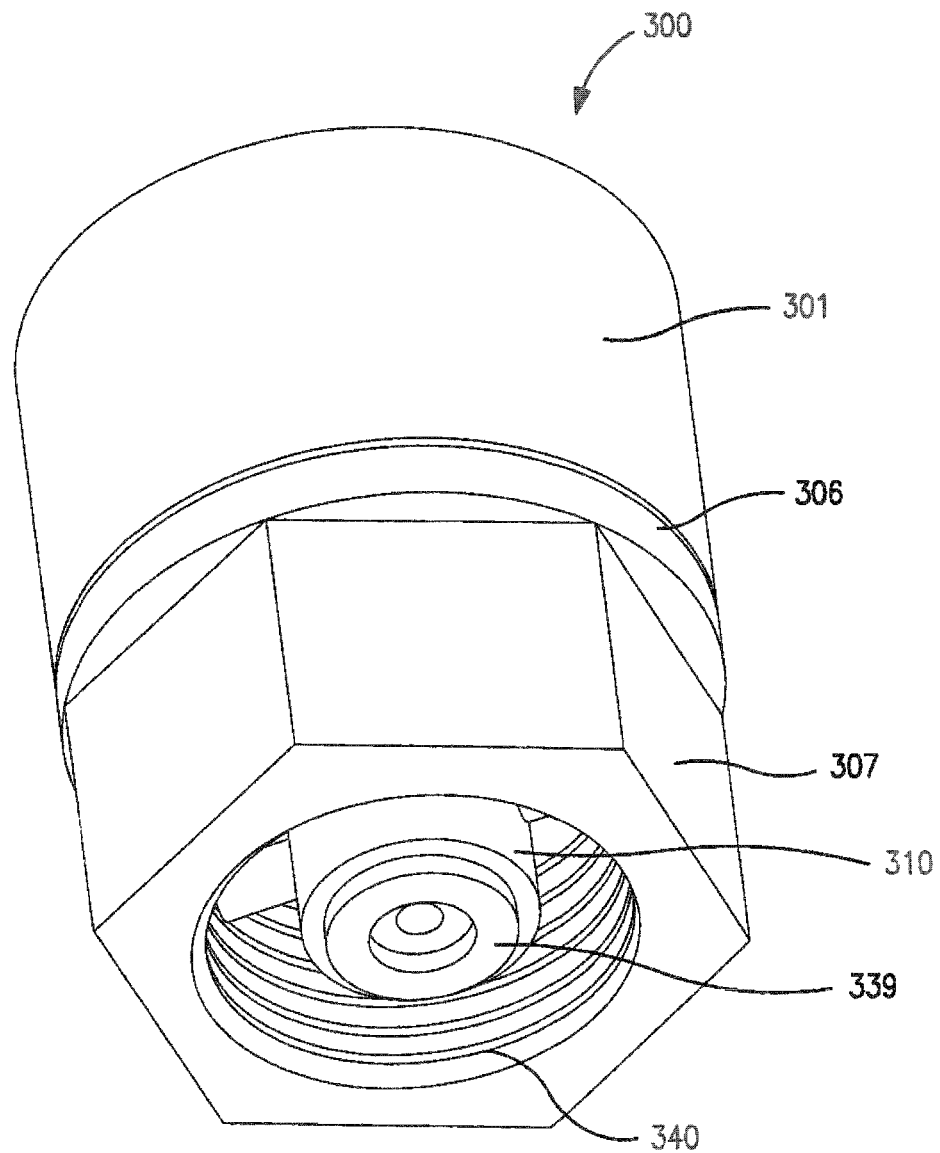
FIG. 3 shows a perspective view of the pressure indicating device of the present invention of FIGS. 1 and 2.

FIG. 3 shows device 300, which represents the device 200 of FIG. 2 in perspective view. Bottom housing 307 has sealing members which prevents leakage of gas across the device 200. Specifically, a sealing member 310 and sealing gasket 339 are shown along the bottom housing 307. The sealing member 310 and sealing gasket 339 engage within lateral port 108 of valve body 101 (FIG. 1b) to enable internally leaked gas (i.e., gas that has flowed across valve seat 111) from flowing beyond device 300 and being released to the atmosphere. Threads 340 can threadably engage onto complimentary threads along lateral port 108 of valve body 101. It should be understood that other variations as known in the art for creating sealing surfaces between device 300 and valve body 101 are contemplated.

The criteria for designing a suitable device 200 in accordance with the embodiments shown in FIGS. 1a, 1b and FIGS. 2a, 2b may be dependent upon various parameters. For example, the design of the device 200 would preferably take into account several parameters, including determining the minimal activating pressure within reservoir 208 at which elevated levels of leaked gas would be considered toxic or could cause a small fire or popping noise if released to the atmosphere. In one embodiment, the activating pressure at which the diaphragm 206 should be designed to flex and urge the pin 204 outwards to pierce material 213 can range from about 10 psi up to about the maximum pressure of the cylinder.

Still further, the design of a suitable diaphragm 206 should also take into consideration the type of gas being supplied. The type of gas stored can affect the required thickness of the diaphragm 206. A low pressure exerted against the bottom surface of the disc 231 may require a relatively thinner diaphragm 206 to be employed. For example, gases such as arsine are liquefied gases, having a pressure limited by their vapor pressure. Arsine exerts a vapor pressure of approximately 200 psig at 70° F. Because such a relatively low supply pressure exerts a small amount of pressure at the bottom surface 231 of the diaphragm 206, a thinner and less stiff diaphragm 206 more prone to flexing may be preferable, as even relatively low concentrations of released arsine into the atmosphere would be considered hazardous.

Other gases, which are filled into cylinders at pressures of 1250 psig or higher and which may be less hazardous, may potentially require a thicker more rigid diaphragm 206 to avoid premature flexing of the diaphragm 206 that would visually indicate a false positive. In another embodiment, if the gas being stored within a cylinder is silane, the diaphragm 206 may be configured to flex in response to an activating pressure within reservoir 208 that corresponds to a certain number of grams of leaked silane sufficient to cause silane popping. The pressure indicating device of the present invention can be uniquely identified to ensure it is attached and used with the intended cylinder. In this manner, inadvertent attachment of, for example, a high pressure indicating device to a low pressure cylinder or vice versa can be avoided. In one example, the pressure indicating device can be color coded to that of its corresponding cylinder for which it is intended.

Selection of a suitable material for diaphragm 206 can include spring steel, metal alloys and the like. Different materials will require different thicknesses to flex at a predetermined activating pressure for a particular gas having a defined pressure within cylinder. Accordingly, the thickness of the disc and the rigidity or strength of the disc are preferably also taken into account along with material selection.

Design of the diaphragm 206 can also taken into consideration the net effective volume of the reservoir 208 into which leaked gas accumulates prior to the diaphragm 206 flexing. The size of the cylinder may also be taken into account. Still further, other design considerations may include the distance the disc is required to flex before contacting pin 204 (i.e., denoted as predetermined gaps 235 and 236 in FIG. 2a). An optimal design of the device 200 will involve balancing the aforementioned design parameters to allow the diaphragm 206 to selectively flex in response to a predetermined activating pressure. The aforementioned parameters interact with each other to determine the final design and construction of the diaphragm 206 and overall device 200.

Designing and constructing the diaphragm 206 to selectively flex within a specific pressure range ensures that cylinders are removed from service by an operator only when necessary. A build up of pressure below the activating pressure may still allow removal of the device 100 from the cylinder user port 108 if determined that the leaked gas from cylinder would be released to levels which are not dangerous and/or which are released at levels that are diluted to a virtually safe level. The ability of the device 200 to be tuned to a specific activating pressure to provide such visual indications can therefore avoid false positives.

Numerous techniques can be employed for constructing device 100. One possible means for the construction of the device 100 of the present invention can be better understood in relation to FIG. 4, which shows the spatial arrangement of components relative to each other prior to their assembly. The stabilizing material 418, the pin 404 and the diaphragm 406 are assembled so as to be contained within the top housing 401. The pin 404 is slightly tensioned to a few psig with an accompanying spring 403 helically coiled around the pin 404. In this manner, the spring 403 prevents the pin 404 from inadvertently moving towards the top housing portion 401 and piercing material 413 in the neutral or relaxed state to generate a false positive reading.

Figure 4:
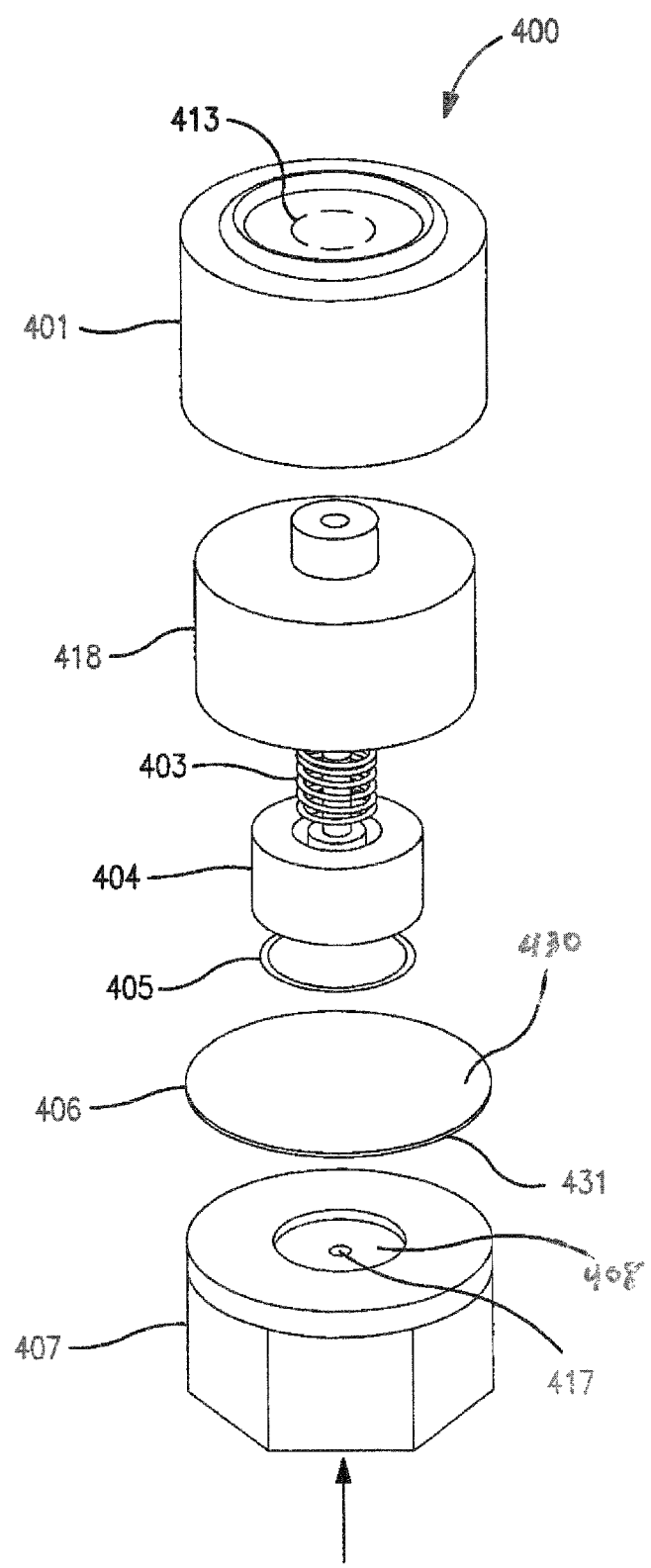
FIG. 4 shows components prior to assembly of the pressure indicating device of the present invention in accordance with principles of the present invention.

Furthermore, although not visible in FIG. 4, a gradual taper can be created from each of the edges of the stabilizing material 418 to the sides of the pin 404, as shown in FIG. 2a, to create the necessary gaps for diaphragm 406 to flex in response to an activating pressure.

A gasket 405 may be optionally disposed between the bottom of the pin 404 and the top surface 430 of the diaphragm 406 to ensure adequate contact between the diaphragm 406 and the pin 404. Gasket 405 creates a gap 235 that is designed to prevent an electrical contact between pin 204 and top surface 230. In this manner, no electrical conductivity exists between pin 204 and top housing 201 in the neutral state. Conversely, in the activated state, electrical conductivity exists between the pin 204 and the top housing 201. The gasket 405 may be optional if only a small pin displacement has occurred. Leaked gas extends in an upwards direction (as shown by the arrow in FIG. 4), through gas channel 417 and thereafter terminates into a reservoir 408. The reservoir 208 as shown in FIGS. 2a and 2b is created after the bottom surface 431 of the diaphragm 406 has been sealed onto the lower housing portion 407. Specifically, the reservoir 208 is defined by the bottom surface 431 of the diaphragm 406, the indented surface 408 of the bottom housing portion 407 and the periphery of the indented surface 408. The edges of the diaphragm 406 along its top surface 430 are welded to the top housing portion 401 and the edges of the diaphragm 406 along its lower surface 431 are welded to the lower housing portion 407 thereby creating a seal along the periphery of the device 400. The weld preferably extends completely around the periphery of the top surface 430 and bottom surface 431 of diaphragm 406. The weld bead preferably has a thickness equivalent to at least a portion of the wall thickness of the top housing portion 401 and the lower housing portion 407. The welds are sufficiently strong to withstand pressure of the leaked gas within reservoir 408. The remainder of the diaphragm 406 remains unwelded to allow it to flex in response to a predetermined activating pressure, as shown in FIG. 2b.

The top housing portion 401 may contain an opening along its top-most surface for material 413 to be affixed. The lower housing portion 407 can be machined to specific dimensions which will match the corresponding dimensions of lateral port 108 of valve body 101 (FIG. 1b). Final assembly of the components of FIG. 4 preferably occurs by welding.

The pressure indicating device of the present invention as has been described advantageously allows cylinders to be removed from service before removing the device and exposing an operator to dangerous levels of gases at the user port 108. Silane pops can be avoided when the pressure indicating device of the present invention has visually indicated an extended pin through pierced material. Because the device remains affixed to the valve body of the cylinder and the pin is protruding through pierced material, the pin does not revert back into the top housing portion of device. The visual indicator is therefore permanent and notifies the operator to remove the cylinder from the production area. The unsafe cylinder can be returned to the factory where personnel can wear protective equipment and perform standard safety handling procedures during removal of device. After the device is removed from the user port of cylinder, a waste line can be connected in which the valve of the cylinder is opened to safely transfer the gas to a scrubber or another cylinder.

Other design alternatives may be employed to achieve a predetermined flexing of the diaphragm. In an alternative embodiment, the pressure indicating device does not contain a reservoir into which the leaked gas accumulates. Rather, when the diaphragm of the device initially flexes upwards, the surface area of the bottom surface of the diaphragm that the leaked gas pushes against increases, thereby allowing continued flexing until the complete activated state has been achieved.

Although the present invention has been described in reference to leaks within cylinders, it should be understood that the present invention can be employed in any suitable high pressure storage and delivery package. Furthermore, the pressure indicating device may be used in combination with other devices, such as, for example, a pressure relief valve.

Although the present invention can eliminate the occurrence of silane pops, the present invention can also be useful as an pressure indicating device to detect dangerous levels of toxic gases which are not pyrophoric but which will visually indicate to an operator that the cylinder contains a toxic amount of gas behind the device such that the device should not be removed to expose the user port.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. A pressure indicating device for recording and isolating a leak of pressurized gas from a closed valve of a gas cylinder, comprising:
    a housing defined, in part, by an upper housing portion and a lower housing portion, the upper housing portion characterized by an inner channel extending therethrough, and the lower housing portion characterized by a gas flow channel extending therethrough, the lower housing portion disposed within a user port of the cylinder valve;
    a movable pin disposed within the interior channel of the upper housing portion;
    a solid diaphragm in a neutral state disposed between the upper and the lower housing portions, the diaphragm having a bottom surface and a top surface, the top surface of the solid diaphragm oriented towards the pin, and the bottom surface of the solid diaphragm oriented towards the lower housing portion, wherein the bottom surface is in fluid communication with the gas flow channel, the diaphragm sealed in place along an edge thereof;
    a seal extending along an outer surface of the upper housing through which the pin is configured to extend when said pin is in the activated state;
    wherein the solid diaphragm is configured to flex from a neutral state to an activated state towards the pin in response to a predetermined activating pressure exerted against at least a portion of the bottom surface of the diaphragm, the diaphragm in the activated state flexing a sufficient amount against the pin so that a portion of the top surface of the diaphragm urges the pin from within the inner channel a sufficient axial distance through the upper housing so as to move the pin externally of the housing, thereby allowing the pin to pierce the material and visually indicate the leak of the pressurized gas from within the interior volume of the cylinder.

2. The device of claim 1, further comprising a stabilizing material disposed within an interior volume of the upper housing portion, the stabilizing material being substantially stationary and surrounding one or more surfaces of the pin.

3. The device of claim 2, wherein a predetermined gap exists between the stabilizing material and the pin, the pin configured to slidably move towards the stabilizing material when the diaphragm moves from the neutral state to the activated state.

4. The device of claim 1, further comprising a reservoir defined in part by the lower housing portion and the bottom surface of the diaphragm.

5. The device of claim 4, wherein the gas flow channel terminates into the reservoir.

6. The device of claim 1, wherein the device has a predefined first gap between at least a portion of the bottom surface of the stabilizing material and the top surface of the diaphragm in the neutral state.

7. The device of claim 1, wherein the device has a predefined third gap between a surface of the lower housing portion and the bottom surface of the diaphragm in the activated state.

8. The device of claim 1, wherein the diaphragm in the activated state is maintained in the flexed configuration whereby the bottom surface of the diaphragm is spaced apart from the lower housing with the bottom surface of the diaphragm at a pressure equal to or greater than the predetermined activating pressure.

9. A system for isolating and indicating a leak of pressurized gas, comprising:
    a cylinder for holding a pressurized gas;
    a user pathway defined in part by a valve body affixed to an upper part of the cylinder;
    a pressure indicating cap having an upper housing and a lower housing mated thereto, the lower housing threadably engaged within the user pathway of the cylinder, the lower housing having a gas flow channel configured to receive a flow of the pressurized gas;
    the cap further comprising a disc disposed between the upper housing and the lower housing, the disc having a periphery fixably attached to corresponding edge portions of the upper and the lower housing;
    a movable pin situated within the upper housing, the pin spaced apart a predetermined distance from the top surface of the disc;
    wherein the top surface of the disc is configured to flex from a neutral state towards the pin in response to a predetermined accumulation of pressure within the gas flow channel that is exerted against the bottom surface of the disc, the top surface of the disc flexed a sufficient amount to exert a force that pushes the pin outwardly from the upper housing in an axial direction so as to record a pressure leak.

10. The system of claim 9, further comprising a stabilizing material disposed within the upper housing, the stabilizing material having a channel into which the pin slidably engages.

11. The device of claim 10, further comprising a central axis of the device extending through the gas flow channel, the main body portion of the disc and the axially extending portion of the movable pin.

12. The device of claim 10, wherein the stabilizing material has a rigidity greater than the disc.

13. The device of claim 10, wherein the disc in the neutral state has the bottom surface substantially in contact with the lower housing, and the disc in the flexed state has at least a portion of the bottom surface spaced away from the lower housing with a corresponding portion of the top surface in contact with the pin and the stabilizing material.

14. The system of claim 9, wherein the gas flow channel terminates into a reservoir.

15. The device of claim 9, further comprising a seal extending along an outer surface of the upper housing through which the pin is configured to extend when said pin is in the activated state.

16. The device of claim 9, wherein the pin comprises a spring coiled around the pin.

17. The device of claim 16, wherein the spring is wound to a pressure sufficient to prevent axial extension of the pin from within the upper housing in the absence of the predetermined accumulation of pressure within the gas flow channel exerted against the bottom surface of the disc.

18. The device of claim 9, wherein the disc is maintained in a flexed configuration, wherein the bottom surface of the disc is spaced apart from the surface of the lower housing.

19. The device of claim 18, wherein the bottom surface of the disc is at cylinder pressure or lower.

\* \* \* \* \*